Oct. 20, 1942.  C. C. FARMER  2,299,476
BRAKE CONTROL MEANS
Filed May 28, 1941
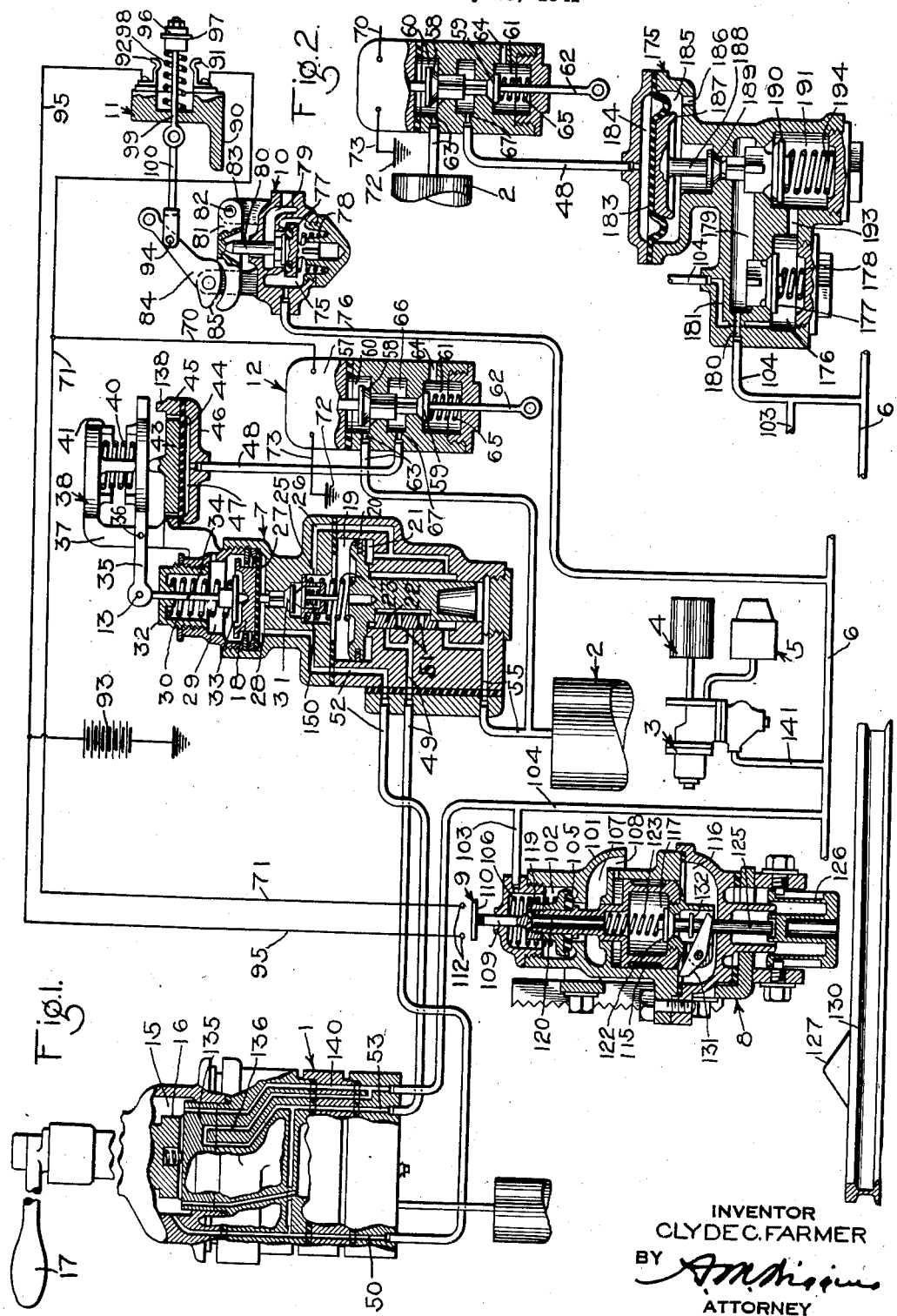
INVENTOR
CLYDE C. FARMER
BY 
ATTORNEY Patented Oct. 20, 1942

2,299,476

UNITED STATES PATENT OFFICE 2,299,476

BRAKE CONTROL MEANS

Clyde C. Farmer, Pittsburgh, Pa., assignor to The Westinghouse Air Brake Company, Wilmerding, Pa., a corporation of Pennsylvania Application May 28, 1941, Serial No. 395,554

19 Claims. (Cl. 303—18)

This invention relates to fluid pressure brakes for railway trains, and more particularly to a brake system controlled automatically from the track or manually from each car of a train, to effect an application of the brakes.

In a fluid pressure brake system for railway vehicles employing both automatically operative means, such as a trip cock device controlled from the track, and manually operative means, such as a conductor's valve, to vent fluid under pressure from the brake pipe for effecting an application of the brakes, it is desirable to prevent the release of the brakes until the operator performs a required act, which he may accomplish without leaving his post of duty.

The principal object of my invention is to provide means which is operative, upon effecting an application of the brakes by the operation of either a trip cock device or a conductor's valve device, to prevent releasing of the brakes until manipulated by the operator.

Another object of the invention is to provide means whereby a brake application effected by the operation of either a trip cock device or a conductor's valve device will be maintained effective until a manual resetting operation is performed by the operator.

A further object of the invention is to provide electrically controlled means which is responsive, upon effecting an application of the brakes by the operation of either a trip cock device or a conductor's valve device, to prevent release of the brakes until manually reset by the operator.

In the accompanying drawing, Fig. 1 is a diagrammatic view, mainly in section, of fluid pressure brake apparatus embodying one form of the invention.

Fig. 2 is a diagrammatic sectional view of a portion of the apparatus and illustrating another form of the invention.

As shown in Fig. 1 of the drawing, the equipment may comprise, an engineer's brake valve device 1, a main reservoir 2, a brake controlling valve device, such as a triple valve device 3, an auxiliary reservoir 4, a brake cylinder 5, a brake pipe 6, a feed valve device 7, a trip cock device 8 provided with an electric switch 9, a conductor's valve device 10, an electric switch 11 adapted to be controlled by the conductor's valve device 10 and a magnetically operated valve device 12.

Considering now more in detail the devices briefly referred to above, the brake valve device 1 may be of any one of a number of types employed in automatic brake apparatus, and as shown comprises a casing having a valve chamber 15 containing a rotary valve 16, operated by means of a handle 17.

The triple valve device 3 is shown in outline form, and may be of any suitable type which is operative upon a reduction in brake pipe pressure to supply fluid under pressure from the auxiliary reservoir 4 to the brake cylinder 5, and which is operative upon an increase in brake pipe pressure to release fluid under pressure from said brake cylinder and to recharge the auxiliary reservoir 4 from the brake pipe.

The feed valve device 7 may be somewhat similar in construction to that of the usual feed valve device and is preferably of large capacity and of the remote controlled type. This device may comprise a casing having a piston chamber 19 containing a piston 20 and also having a valve chamber 21, in which is disposed a slide valve 22 which is adapted to be operated by the stem of the piston 20. The piston 20 is subjected on one side to pressure of fluid in chamber 21 and on the other side to pressure of fluid in chamber 19 as well as to the pressure of a spring 23. Chambers 19 and 21 are in communication with each other by way of a passage 26 in which there is interposed a restriction 25.

The regulating portion of the feed valve device may comprise a flexible diaphragm 27 which is interposed between a chamber 28 and a chamber 29 formed in the casing. The diaphragm 27 is subject on one side to the pressure of fluid in chamber 28 and on the other side to the pressure of an adjustable coil spring 30 and is adapted to control the operation of a valve 31 interposed between the piston chamber 19 and the chamber 28 which valve is operative to control a communication extending between the chambers 19 and 28. The spring 30 is interposed between and operatively engages the inner wall of an adjustable cap nut 32, which closes the upper end of chamber 29, and a spring seat 33 which engages the diaphragm 27 and transmits the spring force to the diaphragm, through the medium of a diaphragm follower 18. The spring seat 33 is provided with a stem 34 which extends through a central opening in the cap nut 32 to the exterior of the casing. The outer end of this stem is operatively connected to one end of a control lever 35, by means of a pin 13, which lever is pivotally connected, at a point intermediate its ends, by means of a pin 36, to a bracket 37.

The bracket 37 is a part of a regulating mechanism 38 which may be secured in any suitable manner to the casing of the regulating portion of the feed valve device 1. This regulating mechanism 38 further comprises a spring 40 which is interposed between and operatively engages one side of the other end of the lever 35 and a horizontal extending portion 41 of the bracket 37. At this end of lever 35 and operatively engaging the opposite side thereof is a diaphragm follower 43 which is adapted to be operated by means of a diaphragm 44, which is clamped between a horizontal extending portion 45 of the bracket 37 and a cover portion 46. The cover portion 46 and the lower side of the diaphragm 44 form a chamber 47 which is in constant open communication with a pipe 48 leading to the magnetically operated valve device 12.

A feed valve supply pipe and passage 49 leads from the slide valve seat 22 to the usual feed valve passage 50 in the brake valve device 1.

The slide valve 22 of the feed valve device 7 is provided with large capacity ports 51 adapted in the feed position of the slide valve to register with corresponding ports leading to the feed valve supply pipe 49.

The diaphragm chamber 28 of the feed valve device 7 is open to a passage and pipe 52 called the feed valve control pipe which pipe leads to the brake valve device 1 and is connected to a passage 53 in the brake valve device 1 leading to the seat of the rotary valve 16.

The slide valve chamber 21 of the feed valve device 7 is in constant open communication with a passage and pipe 55 leading to the main reservoir 2.

The magnetically operated valve device 12 which is provided for the purpose of controlling the operation of the regulating mechanism 38, may comprise an electro-magnet 57 adapted to control oppositely seating or double beat valves 58 and 59 contained in chambers 60 and 61, respectively. The valve 58 is of larger diameter than the valve 59 and the valve 59 is provided with a stem 62 which extends to the exterior of the casing for a purpose hereinafter described.

The chamber 60 is connected to the main reservoir 2, by way of a passage and pipe 63 and pipe 55. The chamber 61 is connected to the atmosphere by way of a passage 64. A spring 65 disposed in chamber 61 at all times tends to seat the valve 59 and unseat the valve 58. A chamber 66 is provided in the casing between the seats of the valves 58 and 59, which chamber is connected to the pipe 48 by way of a passage 67.

One end of the winding of the electro-magnet 57 of the magnetically operated valve device 12 is connected to the electric switch 11, associated with the conductor's valve 10, and to the electric switch 9 of the trip cock device 8, by means of conductors 70 and 71, and the other end of the winding is connected to the ground, by means of a conductor 73.

The conductor's valve device 10 for venting fluid under pressure from the brake pipe and for controlling the operation of the switch 11 may comprise a casing having a chamber 75 which is in constant open communication with the brake pipe 6 by way of a pipe 76. Contained in this chamber is a valve 77 and a spring 78 for normally seating the valve to close communication between the chamber 75 and a chamber 79, which latter chamber is in constant open communication with the atmosphere.

The valve 77 is provided with a stem 80 which extends to the exterior of the casing, the outer end of which stem engages a pivot arm 81 fulcrumed on a pin 82 mounted in a lug 83 projecting from the casing. For operating the arm 81 a pivoted handle 84 is provided having a cam portion 85 for rotating the arm counterclockwise, so as to actuate the stem 80 and thereby unseat the valve 77, which valve when unseated establishes communication between chambers 75 and 79.

The electric switch 11 for controlling an electric circuit to the magnetically operated valve device 12 may comprise a rigid base 90 provided with spaced spring contact terminal fingers 91 and 92, respectively. The finger 91 is connected to the conductor 71 and the finger 92 is connected to a storage battery 93, by means of a conductor 95.

The switch is also provided with a plunger 96 having a member 97 for connecting the two contact fingers 91 and 92, and is further provided with a spring 98 interposed between and operatively engaging the plunger 96 and the base 90 for normally maintaining the member 97 out of engagement with the fingers 91 and 92. The plunger 96 is provided with a stem 99 which extends through a central opening in the base 90. The outer end of this stem is operatively connected to one end of a rod 100, which rod is connected at its opposite end to the handle 84 of the conductor's valve device 10, by means of a pin 94.

The trip cock device 8 which is adapted to be operated by a trip member located along the track for venting fluid under pressure from the brake pipe to effect an application of the brakes, is somewhat similar to the trip cock device shown, described and claimed in Patent No. 1,104,787, issued to A. England, July 28, 1914.

This device may comprise a casing 101 having a valve chamber 102 which is in constant open communication with the brake pipe 6 by way of a pipe 103 and a connected pipe 104. Contained in this chamber is a valve 105 and a spring 106 for normally seating the valve 105 to close communication between the chamber 102 and a chamber 107 which is in constant open communication with the atmosphere, by way of a passage 108. The valve 105 is provided with a stem 109 which extends upwardly to the exterior of the casing and at its end carries a contact member 110 which is suitably insulated from the stem. Contact member 110 is adapted to engage a pair of stationary contacts 112, when the valve 105 is moved out of engagement with its seat. As shown in the drawing, the contact member is normally maintained out of contact with the stationary contacts 112, when the valve 105 is in engagement with its seat.

One of the contacts 112 is connected to the conductor 95 leading to one terminal of the storage battery 93 and the other contact 112 is connected to the conductor 71. The other terminal of the battery is connected to ground.

For operating the valve 105 and the attached contact member 110, a piston 115 is provided, which piston is subject on one side to atmospheric pressure in chamber 107, and on the opposite side to the pressure of fluid in a chamber 116. The piston is provided with a chamber 117 which is in constant open communication with the chamber 102 through a plurality of ports 119 and a passage 120 provided in the valve stem. Contained in chamber 117 is a pilot or auxiliary valve 122 adapted to control communication between chamber 116 and chamber 117, which valve is normally held in engagement with its seat by means of a light spring 123. The pilot valve 122 is provided with a stem 125 which is slidably guided by the casing and which is adapted to be actuated by the vertical movement of a trip 126 which, in turn, is adapted to be operated by the track mechanism, such as a trip member 127 located along the track 130.

Operation (Fig. 1)

As illustrated in Fig. 1 of the drawing the equipment is in its normal operating position, that is to say, the system is fully charged with fluid under pressure and the brake valve device 1 and the other operating valve devices are in their release position.

In charging the equipment, fluid under pressure supplied to the main reservoir 2 in the usual manner flows therefrom to the slide valve chamber 21 of the feed valve device 7 by way of pipe and passage 55 and to the chamber 60 of the magnetically operated valve device 12 by way of pipe 55 and pipe and passage 63.

Fluid under pressure thus supplied to chamber 60 flows past unseated valve 58 to chamber 66 and from thence to the chamber 47 of the regulating mechanism 38, by way of passage 67 and pipe 48. When the fluid pressure in chamber 47 has been increased to a degree sufficient to overcome the opposing force of the spring 40 acting on the lever 35, the regulating mechanism is moved to the position in which it is shown in the drawing. With the regulating mechanism 38 in this position the spring 49 is maintained ineffective, and as a consequence, the regulating spring 39 of the feed valve device 7 acts through the medium of the spring seat 33, the diaphragm follower 18 and diaphragm 27 to unseat the valve 31.

When the valve 31 is in its unseated position, fluid under pressure flows from piston chamber 19 to the diaphragm chamber 28 and from this latter chamber flows through passage and pipe 52 to the passage 53 in the brake valve device 1.

Fluid under pressure in chamber 21 flows to chamber 19 by way of passage 26 at a restricted rate as controlled by the restriction 25, so that there will be a preponderance of pressure in chamber 21 which causes the piston 20 and attached slide valve 22 to move from the position in which they are shown in the drawing to their outermost position. In this position the ports 51 in the slide valve 22 register with the supply ports leading to the feed valve supply passage and pipe 49, so that fluid under pressure from the main reservoir 2 and connected feed valve chamber 21 now flows to pipe 49 and from thence flows to the rotary valve chamber 15 of the brake valve device 1, by way of passage 50 in the brake valve device 1.

With the rotary valve 16 of the brake valve device in release position, as shown in Fig. 1 of the drawing fluid under pressure in chamber 15 of the brake valve device flows through a passage 140 in the brake valve device and pipe 104 to the brake pipe 6. At the same time a cavity 135 in the rotary valve 16 connects passage 53 with a passage 136, the latter passage being in constant open communication with the passage 140, so that fluid under pressure in passage 53 flows to the brake pipe 6. Fluid under pressure supplied to pipe 104 also flows through the connected pipe 103 to the chamber 102 of the trip cock device 8.

Fluid under pressure thus supplied to chamber 102 flows from thence to chamber 117 by way of ports 119 and passage 120 in the stem of the piston 115. The chamber 116 located below the piston 115, is normally at atmospheric pressure, as any fluid under pressure leaking into said chamber will escape around the piston 115 to the chamber 107 and the exhaust outlet 108, piston 115 having a loose fit in its guide bore. Therefore, when the chambers 102 and 117 are thus charged with fluid under pressure, the combined force of the fluid and the spring 106 acting on the seated area of the valve 105 acts to move the operating parts to their release position, as shown in the drawing.

Fluid under pressure supplied to the brake pipe 6 flows through branch pipe 141 to the triple valve device 3. The triple valve device 3 operates upon an increase in brake pipe pressure to charge the auxiliary reservoir 4 and to connect the brake cylinder 5 to the atmosphere in the usual manner.

Fluid under pressure in the brake pipe 6 also flows through the pipe 76 to the chamber 75 of conductor's valve, and with the handle 84 in the position shown, forces the valve 77 more tightly into seating engagement with its seat.

By supplying fluid under pressure from the feed valve 7 to the brake pipe 6 in the manner just described, the brake pipe pressure and consequently the pressure of fluid in chamber 47 of the regulating mechanism 38 is rapidly increased. When the fluid pressure in chamber 47 has been increased to some predetermined degree below the pressure normally carried in the brake pipe, said pressure acts through the medium of the diaphragm 44 and diaphragm follower 43 to rock lever 35 about the pivot pin 36, against the opposing pressure of spring 40, to the position in which it is shown in Fig. 1 of the drawing. With the lever 35 thus positioned, fluid under pressure acting in chamber 47 maintains the spring 40 ineffective, and as a consequence, the regulating spring 39 of the feed valve device 7 acts through the medium of the spring seat 33 and diaphragm follower 18, in the usual manner, thus the brake pipe pressure is increased to the pressure normally carried in the brake pipe, as determined by the adjustment of the regulating spring 39 in the feed valve device 7. When the pressure in the brake pipe and in the diaphragm chamber 28 of the feed valve device 8 have been increased to the adjusted pressure, the diaphragm 27 is caused to flex upwardly so as to permit the valve 31 to seat. Now when the fluid pressure in chamber 19 becomes substantially equal to the main reservoir pressure in chamber 21, the spring 23 acts to move the piston 20 and attached slide valve 22 to the position in which they are shown in the drawing, wherein the supply of fluid from the slide valve chamber 21 to the feed valve control pipe 49 is cut off.

Application of the brakes by operation of the trip cock device

If the trip member 126 of the valve device 8 on the vehicle is now brought into operative engagement with the stationary trip member 127 along the track 130, the valve stem 125 is actuated by movement of the trip member 126 to lift the pilot valve 122 from its seat, thereby establishing communication between chambers 116 and 117. With valve 122 unseated fluid under pressure in chamber 117 flows to chamber 116 below the piston 115. Since the opposite side of the piston 115 is subject to atmospheric pressure, and the only force opposing movement of the piston is that of the fluid and spring 106 in chamber 102 acting on the valve 105, the pressure of fluid supplied to chambers 116 by way of chamber 117 causes the piston 115 to move upwardly the piston in its traverse unseating valve 105 and moving the contact member 110 into circuit closing engagement with the contacts 112.

An arm 131 is pivotally connected to the piston 115. One end of the arm is adapted to engage a fixed part of the casing, while the other end of the arm is adapted, upon upward movement of the piston 115, to engage a collar 132 on the valve stem 125, so that upon upward movement of the piston 115 the arm 131 will be rocked on its pivot and the pilot valve 122 will be maintained off its seat by engagement of one end of the arm 131 with the collar 132, thus, as will hereinafter more fully appear, insuring that the valve 105 will be maintained open for a sufficient time to vent sufficient fluid under pressure from the brake pipe to insure the desired application of the brakes.

With the valve 105 unseated fluid under pressure is vented at an emergency rate from the brake pipe 6 by way of pipes 104 and 103, chamber 102, past unseated valve 105, chamber 107 and passage 108. In response to the sudden reduction in brake pipe pressure thus effected, the triple valve device 3 functions in the usual well known manner to cut off the atmospheric communication from the brake cylinder 5 and to supply fluid under pressure from the auxiliary reservoir 4 to the brake cylinder thereby effecting an emergency application of the brakes.

With the contact member 110 in circuit closing engagement with the contacts 112, the magnetically operated valve device 12 is energized by current from the battery 93. The circuit for energizing the winding comprising battery 93, conductor 95, one of the stationary contacts 112, contact member 110 of the switch 9, the other stationary contact 112, conductor 71, connected conductor 70, through the winding of the electro-magnet 57, conductor 73 and ground 72.

When the winding of the electro-magnet 57 is energized in the manner just described, the upper valve 58 is seated and the lower valve 59 is unseated. With the valve 58 seated communication between chambers 60 and 66 is cut off and with the valve 59 unseated communication between chambers 61 and 66 is established. Under these conditions fluid under pressure in chamber 47 of the regulating mechanism 38 will be vented to the atmosphere by way of pipe 48, passage 67, chamber 66, past unseated valve 59, chamber 61 and passage 64.

Upon the venting of fluid under pressure from chamber 47, the spring 40, acting on the lever 35 causes said lever to rotate in a clockwise direction about the pivot pin 36, until it engages a stop 138 on the portion 45.

The lever as it is thus rotated moves the stem 34 and thereby the spring seat 33 of the feed valve device upwardly compressing spring 30, thus relieving the diaphragm 27 of the pressure of the spring 30. With the diaphragm thus relieved of the pressure of the spring 30, fluid under pressure in chamber 28 will cause the diaphragm 27 to flex upwardly thereby permitting the spring 150 to act to seat the valve 31. The valve will now be maintained seated by the pressure of the spring 150 and the pressure of fluid in chamber 19.

It should here be mentioned that at substantially the same time as or just before the reduction in brake pipe pressure is initiated by the unseating of the valve 105, the valve 31 of the feed valve device will seat, so that the reduction in brake pipe pressure will not cause a corresponding reduction to be effected in the pressure of fluid in piston chamber 19. Therefore, the piston 20 and slide valve 22 will remain in the position in which they are shown, the slide valve in this position preventing the flow of fluid under pressure from the slide valve chamber 21 to the feed valve supply pipe 49 and thereby the brake pipe.

The length of time that the valve 105 remains unseated and consequently the length of time the attached contact member 110 of the switch 9 remains in contact with the stationary contacts 112, depends upon the opposing pressure of the spring 106 and the brake pipe pressure acting in the chamber 116 below the piston 115. In this connection it will be noted that as soon as the brake pipe pressure in chamber 116 falls below the pressure of the spring 106, the piston 115, valve 105 and attached contact member 110 are shifted downwardly by the spring 106 to the position in which they are shown in the drawing. The downward movement of the piston 115 also causes arm 131 to release the pilot valve 122, so that spring 123 now acts to return the pilot valve to its seat.

With the contact member 110 in its circuit opening position the electro-magnet 57 is deenergized. However, the valve 58 will still remain seated and the valve 59 unseated since the pressure of main reservoir fluid acting on the large area of valve 58 is greater than the opposing force of the spring 65 acting on the valve 59. With the valves 58 and 59 so positioned, the regulating spring 30 of the feed valve device 7 remains ineffective and the piston 20 and attached slide valve 22 remain in their release position as hereinbefore described.

From the foregoing description it will be understood that the feed valve device 7 will be rendered inoperative to effect restoration of the pressure of fluid in the brake pipe 6 to the degree necessary to effect the release of the brakes until the valves 58 and 59 of the magnetically operated valve device 12 are returned to the position in which they are shown in the drawing.

When it is desired to release the brakes the valves 58 and 59 must be returned to their normal position as shown in Fig. 1 and this is done through the medium of the stem 62 which the operator forces upwardly. When the valves 58 and 59 of the electrically operated valve device 12 are thus returned to the position in which they are shown in the drawing, fluid under pressure from the main reservoir 2 flows to the chamber 47 of the regulating mechanism 38 in a manner already described. Upon the restoration of fluid under pressure in chamber 47, the feed valve device 7 is rendered operative, as hereinbefore described in connection with initial charging of the system, to supply fluid under pressure from the main reservoir 2 to the brake pipe 6, it being understood that the handle 17 of the brake valve device 1 is in its release position, for effecting a release of the brakes. The resulting increase in brake pipe pressure will cause the triple valve device 3 to operate in the usual manner to vent fluid under pressure from the brake cylinder, so as to release the brakes.

*Application of the brakes by the conductor's valve device*

If the trainman desires to effect an application of the brakes, he moves the handle 84 of the conductor's valve device 10 to the left of the normal position in which it is shown in the drawing. When the handle is thus moved, the cam surface 85 will engage the arm 81 and cause the arm to rotate in a counterclockwise direction and thereby force the valve stem 80 inwardly and consequently the valve 77 from its seat against the opposing pressure of the spring 78. The movement of the handle 84, through the medium of the stem 99 and rod 100, will move the plunger 96, of the switch 11, to the left against the opposing action of the spring 98 until the contact member 97 of the plunger 96 engages the contact fingers 91 and 92.

With the valve 77 thus unseated fluid under pressure is vented at an emergency rate from the brake pipe 6 to the atmosphere, by way of pipe 76, chamber 75 in the conductor's valve device 10, past unseated valve 77 and chamber 79.

With the contact member 97 in its contact closing position the electro-magnet of the magnetically operated valve device is energized from the battery, by way of the conductor 95, contact finger 92, contact member 97, finger 91, conductor 71, connected conductor 70, through electro-magnet 57 and conductor 73 to ground 72.

With the magnetically operated valve device 12 energized and the brake pipe connected to the atmosphere by way of the conductor's device 10 and the brake valve device 1 in release position the several other parts and devices of the equipment will function in the same manner as described in connection with the control of the brakes through the operation of the trip cock device 8.

When the desired application of the brakes has been effected the trainman releases his grasp on the handle 84 of the conductor's valve device 10. The spring 98 now acts to move the handle to the right to its normal position as shown in Fig. 1, in which position the cam 85 will be out of engagement with the lever 81, so that spring 78 acts to seat the vent valve 77 to cut off communication from the brake pipe to the atmosphere. Movement of the handle to this position also moves the connected plunger 96 to its normal position in which the contact member 97 is moved out of engagement with the fingers 91 and 92 as shown in Fig. 1 of the drawing, thus deenergizing the electro-magnet 57 of the magnetically operated valve device 10.

When it is desired to release the brakes the magnetically operated valve device 12 must be reset manually in the same manner as described in connection with the release of the brakes following a trip cock device initiated application of the brakes.

*Modified form of invention*

In Fig. 2 of the drawing a modification of the invention is illustrated which modification may be incorporated in the equipment shown in Fig. 1 by the addition of a cut-off valve device 175 for the purpose of controlling the recharge of the brake pipe with fluid under pressure to release the brakes following a trip cock device or a conductor's valve device initiated application of the brakes, the omission of the regulating mechanism 38 and the association of the magnetically operated valve device 12 with the cut-off valve device. Aside from these modifications, the details of the several parts of the equipment may be identical with those of the equipment shown in Fig. 1.

With the regulating mechanism 38 omitted the feed valve device may be of the usual well known construction and will function in the usual manner to supply fluid under pressure for charging the equipment.

The cut-off valve device 175 is interposed in the pipe 104 at a point located between the brake valve device 1 and the branch pipe 103 leading to the trip cock device 8. This device may comprise a casing having a chamber 176 which is in constant open communication, by way of a passage 181, with that portion of the pipe 104 which leads to the brake valve device 1. Contained in this chamber is a valve 177 subject to the pressure of a spring 178 for normally closing communication between chamber 176 and a chamber 179, which latter chamber is in open communication, by way of a passage 180, with that portion of the pipe 104 which leads to the brake pipe 6.

The cut-off valve device 175 further comprises a flexible diaphragm 183 interposed between a chamber 184, which is connected to the pipe 48 and a chamber 185 which is connected to the atmosphere by way of a port 186. Disposed in chamber 185 and operatively engaging the diaphragm 183 is a diaphragm follower 187 having a stem 188 adapted to control oppositely seating valves 189 and 190. The valve 189 is contained in the chamber 185 and the valve 190 is contained in a chamber 191, which latter chamber is connected to the chamber 176 by way of a passage 193. A spring 194 contained in chamber 191 tends at all times to seat the valve 190 and unseat the valve 189.

*Operation (Fig. 2)*

The operation of the cut-off valve device 175 is similar to that of the regulating mechanism 38 hereinafter described in connection with Fig. 1 of the drawing. With the main reservoir 2 charged with fluid under pressure in the usual manner, fluid under pressure at main reservoir pressure flows to the chamber 60 of the magnetically operated valve device 12. With the valves 58 and 59 of this device in their release position, as shown in the drawing, fluid under pressure in chamber 60 flows to the chamber 184 of the cut-off valve device 175, past unseated valve 58, chamber 66 and passage and pipe 48. When the pressure of fluid in chamber 184 has been increased to a degree sufficient to overcome the opposing action of the spring 194 acting on the opposite side of the diaphragm through the medium of the valve 190, valve 189, stem 188 and diaphragm follower 187, the valves 189 and 190 are moved to their release or normal position in which they are shown in the drawing.

With the handle of the brake valve device 1 in release position, fluid at the pressure maintained by the feed valve device is supplied in the usual manner to that portion of pipe 104 which leads to the diaphragm operated valve device 175. Fluid under pressure supplied to this portion of pipe 104 flows to the brake pipe 6 by way of passage 181 in the cut-off valve device 175, chamber 176, passage 193, chamber 191, past unseated valve 190, chamber 179, passage 180 and through that portion of the pipe 104 which leads to the brake pipe 6.

With the other operating valve devices in their release position as shown in Fig. 1 of the drawing, the fluid under pressure thus supplied to the brake pipe 6 rapidly charges the system to the degree maintained by the feed valve device.

If the trip cock device 8 or the conductor's valve device 10 are operated in the manner hereinbefore described in connection with the equipment shown in Fig. 1 to effect an emergency application of the brakes, the electro-magnet 57 of the magnetically operated valve device 12 will be energized from the battery 93 in the same manner as described in connection with the showing in Fig. 1.

Upon energization of the electro-magnet 57 the valve 58 is seated and the valve 59 is unseated. With the valves 58 and 59 in this position fluid under pressure in chamber 184 of the cut-off valve device 175 is vented to the atmosphere by way of pipe 48, passage 67, chamber 66, past unseated valve 59, chamber 61 and passage 64.

Upon the venting of fluid under pressure from chamber 184 of cut-off valve device 175, the spring 194 acting on valve 190, causes valve 190 to move to its seated position and valve 189 to move to its unseated position. With the valves thus positioned communication between chambers 191 and 179 is cut off and fluid under pressure in chamber 179 is vented to the atmosphere past unseated valve 189, chamber 185 and passage 186.

After either the trip cock device 8 or the conductor's valve device 10 has been operated to effect a reduction in brake pipe pressure and then operated to close the atmospheric communication, fluid under pressure is supplied to that portion of the pipe 104 which is connected to the brake valve device 1 from the main reservoir in the manner already described. With the valve 190 of the cut-off valve 175 seated, however, restoration of the pressure of fluid in the brake pipe 6 to the degree necessary to effect the release of the brakes is prevented, until the operator moves the stem 62 of the magnetically operated valve device 12 upwardly. Movement of the stem 62 upwardly, moves the valves 58 and 59 to the position in which they are shown in the drawing thereby effecting operation of the cut-off valve device 175 to its release position to permit recharging of the system with fluid under pressure in the manner described in connection with initial charging of the equipment.

The purpose of the valve 177 interposed between the chambers 176 and 179 in the cut-off valve device 175 is to provide a by-pass through which fluid under pressure in brake pipe 6 may be reduced when the brake valve device 1 is employed to effect either a service or an emergency application of the brakes.

When the handle 17 of the brake valve device is moved either to service or emergency position, fluid under pressure in that portion of the pipe 104 which is connected to the brake valve device 1 is reduced to the atmosphere. Upon a reduction in fluid pressure in this portion of the pipe 104 the fluid pressure in the connected chamber 176 is correspondingly reduced. The reduction in fluid pressure in chamber 176 is thus made at a much faster rate than fluid under pressure can be supplied from the brake pipe 6, and consequently from the connected chambers 191 and 179 through the passage 193, so that the higher pressure in chamber 179 acting on one side of valve 177 overcomes the opposing action of the spring 178 acting on the other side of the valve 177 and causes the valve to be unseated.

With the valve 177 unseated, a direct unrestricted communication is established between the brake pipe 6 and the brake valve device 1, so that fluid under pressure in the brake pipe 6 may be reduced through the brake valve device 1 in the usual manner to effect either a service or an emergency application of the brakes.

It will thus be seen that my invention provides means interlocked with a trip cock device and a conductor's valve device arranged to permit the usual control of the brakes through the medium of the engineer's brake valve device, and which is rendered operative upon operation of either the trip cock device or the conductor's valve device, to prevent restoration of the normal brake pipe pressure for releasing the brakes, unless the operator performs a required act.

Having now described my invention, what I claim as new and desire to secure by Letters Patent, is:

1. In a fluid pressure brake equipment of the type comprising a normally charged brake pipe, means operative upon a reduction in brake pipe pressure for effecting an application of the brakes and operative upon a subsequent increase in brake pipe pressure for effecting a release of the brakes, means operative in accordance with a track indication for effecting a reduction in brake pipe pressure and manually operative means for effecting a reduction in brake pipe pressure, in combination, electrically controlled means automatically operative upon the operation of either of said brake pipe pressure reducing means for preventing the recharge of the brake pipe with fluid under pressure, and means for manually operating said electrically controlled means to permit the recharge of the brake pipe with fluid under pressure.

2. In a fluid pressure brake equipment of the type comprising a normally charged brake pipe, means operative upon a reduction in brake pipe pressure for effecting an application of the brakes and operative upon a subsequent increase in brake pipe pressure for effecting a release of the brakes, a brake valve device having one position for effecting a reduction in brake pipe pressure and another position for supplying fluid under pressure to the brake pipe for recharging the brake pipe, means controlled from the track for effecting a reduction in brake pipe pressure and means manually controlled independently of said brake valve device for effecting a reduction in brake pipe pressure, in combination, electrically controlled means operative as an incident to the operation of either one of the last two mentioned means for preventing the recharge of the brake pipe with fluid under pressure, and means for manually operating said electrically controlled means to permit the recharge of the brake pipe with fluid under pressure.

3. In a fluid pressure brake equipment of the type comprising a normally charge brake pipe, means operative upon a reduction in brake pipe pressure for effecting an application of the brakes and operative upon a subsequent increase in brake pipe pressure for effecting a release of the brakes, means operative in accordance with a track indication for effecting a reduction in brake pipe pressure and manually operative means for effecting a reduction in brake pipe pressure, in combination, means including a magnet valve device automatically operative to a position in response to operation of either one of said brake pipe reducing means to prevent restoration of brake pipe pressure, and means manually operative to effect movement of the magnet valve device to a normal position for permitting restoration of brake pipe pressure.

4. In a fluid pressure brake equipment of the type comprising a normally charged brake pipe, means operative upon a reduction in brake pipe pressure for effecting an application of the brakes and operative upon a subsequent increase in brake pipe pressure for effecting a release of the brakes, means operative in accordance with a track indication for effecting reduction in brake pipe pressure and manually operative means for effecting a reduction in brake pipe pressure, in combination, means for controlling the recharge of the brake pipe with fluid under pressure, and means comprising a magnetically operated valve device automatically operative to one position upon the operation of either one of said brake pipe reducing means for preventing the recharge of the brake pipe with fluid under pressure, and manually operative to another position to permit the recharge of the brake pipe with fluid under pressure.

5. In a fluid pressure brake equipment of the type comprising a normally charged brake pipe, means operative upon a reduction in brake pipe pressure for effecting an application of the brakes and operative upon a subsequent increase in brake pipe pressure for effecting a release of the brakes, means operative in accordance with a track indication for effecting a reduction in brake pipe pressure and manually operative means for effecting a reduction in brake pipe pressure, in combination, fluid pressure supply means for supplying fluid under pressure to the brake pipe to effect a release of the brakes, magnetically operated means for controlling said fluid pressure supply means, said magnetically operated means being automatically operative upon the operation of either one of said brake pipe reducing means for preventing operation of the fluid pressure supply means to supply fluid under pressure to the brake pipe and manually operative to permit operation of the fluid pressure supply means to supply fluid under pressure to the brake pipe.

6. In a fluid pressure brake equipment of the type comprising a normally charged brake pipe, means operative upon a reduction in brake pipe pressure for effecting an application of the brakes and operative upon a subsequent increase in brake pipe pressure for effecting a release of the brakes, a brake valve device normally operative to control the supply of fluid to and the release of fluid from the brake pipe, a trip cock device automatically controlled from the track for effecting a reduction in brake pipe pressure, a conductor's valve device manually controlled from the vehicle for effecting a reduction in brake pipe pressure, a mechanism for controlling the supply of fluid under pressure to the brake pipe, in combination, control means for rendering said mechanism either operative or inoperative to supply fluid under pressure to the brake pipe, magnetically operated means automatically operative upon the operation of either the trip cock device or the conductor's valve device for effecting operation of the means to render said mechanism inoperative to supply fluid under pressure to the brake pipe, and manually operative for effecting operation of the control means to render said mechanism operative to supply fluid under pressure to the brake pipe.

7. In a fluid pressure brake equipment of the type comprising a normally charged brake pipe, means operative upon a reduction in brake pipe pressure for effecting an application of the brakes and operative upon a subsequent increase in brake pipe pressure for effecting a release of the brakes, a brake valve device normally operative to control the supply of fluid to and the release of fluid from the brake pipe, a trip cock device automatically controlled from the track for effecting a reduction in brake pipe pressure, a conductor's valve device manually controlled from the vehicle for effecting a reduction in brake pipe pressure, a mechanism for controlling the supply of fluid under pressure to the brake pipe, in combination, control means for rendering said mechanism either operative or inoperative to supply fluid under pressure to the brake pipe, a magnet valve device having a normal position for effecting operation of said control means to render the mechanism operative to supply fluid under pressure to the brake pipe and automatically operative for effecting operation of the control means to render the mechanism inoperative to supply fluid under pressure to the brake pipe upon the operation of either the trip cock device or the conductor's valve device, said magnet valve device being operative manually to said normal position.

8. In a fluid pressure brake equipment of the type comprising a normally charged brake pipe, means operative upon a reduction in brake pipe pressure for effecting an application of the brakes and operative upon a subsequent increase in brake pipe pressure for effecting a release of the brakes, means operative in accordance with a track indication for effecting a reduction in brake pipe pressure and manually operative means for effecting a reduction in brake pipe pressure, in combination, a source of electric current and means including a magnet valve device adapted to be energized from said source of current upon the operation of either one of said brake pipe pressure reducing means for preventing the recharge of the brake pipe with fluid under pressure, said magnet valve device being manually operative to a normal position to permit the recharge of the brake pipe with fluid under pressure.

9. In a fluid pressure brake equipment of the type comprising a normally charged brake pipe, means operative upon a reduction in brake pipe pressure for effecting an application of the brakes and operative upon a subsequent increase in brake pipe pressure for effecting a release of the brakes, means operative in accordance with a track indication for effecting a reduction in brake pipe pressure and manually operative means for effecting a reduction in brake pipe pressure, in combination, means operative for preventing the recharge of the brake pipe with fluid under pressure, a magnet valve device operative when energized to effect operation of said means, a battery, and a switch associated with each of said brake pipe pressure reducing means, one or the other switch being operative to complete a circuit from the battery to said magnet valve device for effecting energization of the device upon operation of one or the other of said brake pipe pressure reducing means.

10. In a fluid pressure brake equipment of the type comprising a normally charged brake pipe, means operative upon a reduction in brake pipe pressure for effecting an application of the brakes and operative upon a subsequent increase in brake pipe pressure for effecting a release of the brakes, means operative in accordance with a track indication for effecting a reduction in brake pipe pressure and manually operative means for effecting a reduction in brake pipe pressure, in combination, a feed valve device for recharging the brake pipe with fluid under pressure, and means for automatically rendering said feed valve device inoperative upon the operation of either one of said brake pipe pressure reducing means, said means being manually operative to render said feed valve device operative to recharge the brake pipe with fluid under pressure.

11. In a fluid pressure brake equipment of the type comprising a normally charged brake pipe, means operative upon a reduction in brake pipe pressure for effecting an application of the brakes and operative upon a subsequent increase in brake pipe pressure for effecting a release of the brakes, means operative in accordance with a track indication for effecting a reduction in brake pipe pressure and manually operative means for effecting a reduction in brake pipe pressure, in combination, a feed valve device having a supply portion for supplying fluid under pressure to the brake pipe for recharging the brake pipe and a regulating portion for controlling the supply portion, a mechanism associated with said regulating portion for rendering said feed valve device either operative or inoperative to recharge the brake pipe, and means for controlling said mechanism, said means being automatically operative to effect operation of said mechanism to render said feed valve device inoperative upon the operation of either one of said brake pipe pressure reducing means and being manually operative to effect operation of said mechanism to render said feed valve device operative to recharge the brake pipe.

12. In a fluid pressure brake equipment of the type comprising a normally charged brake pipe, means operative upon a reduction in brake pipe pressure for effecting an application of the brakes and operative upon a subsequent increase in brake pipe pressure for effecting a release of the brakes, means operative in accordance with a track indication for effecting a reduction in brake pipe pressure and manually operative means for effecting a reduction in brake pipe pressure, in combination, a feed valve device for recharging the brake pipe with fluid under pressure, means for rendering said feed valve either operative or inoperative, said means comprising a chamber and being responsive to the supply of fluid under pressure to said chamber for rendering said feed valve device operative and being responsive to the release of fluid under pressure from said chamber for rendering said feed valve device inoperative, and valve means for controlling the supply of fluid under pressure to and the release of fluid under pressure from said chamber, said valve means being automatically operative to vent fluid under pressure from said chamber upon the operation of either one of said brake pipe pressure reducing means and being manually operative to supply fluid under pressure to said chamber.

13. In a fluid pressure brake equipment of the type comprising a brake pipe, a brake valve device having a release position for supplying fluid under pressure to said brake pipe and an application position for releasing fluid under pressure from the brake pipe, brake controlling mechanism operative upon a reduction in the pressure of fluid in said brake pipe to effect an application of the brakes and upon an increase in brake pipe pressure to effect a release of the brakes, means controlled from the track for effecting a release of fluid under pressure from the brake pipe, means manually controlled from the vehicle for effecting a release of fluid under pressure from the brake pipe, in combination, a magnet valve device comprising valve means normally positioned to permit fluid under pressure to flow from the brake valve device to the brake pipe in the release position of the brake valve device, said magnet valve device being operative to move said valve means from the normal position upon operation of either one of said brake pipe pressure reducing means for preventing a subsequent restoration of brake pipe pressure until reset, and means adapted to be manually operated for resetting said valve means.

14. In a fluid pressure brake equipment of the type comprising a brake pipe, a brake valve device having a release position for supplying fluid under pressure to said brake pipe and an application position for releasing fluid under pressure from the brake pipe, brake controlling mechanism operative upon a reduction in the pressure of fluid in said brake pipe to effect an application of the brakes and upon an increase in brake pipe pressure to effect a release of the brakes, a trip cock device automatically controlled from the track for effecting a reduction in brake pipe pressure, a conductor's valve device manually controlled from the vehicle for effecting a reduction in brake pipe pressure, in combination, a mechanism for charging of the brake pipe with fluid under pressure by way of said brake valve device with the brake valve device in release position, means having a normal position to permit said mechanism to operate to charge the brake pipe with fluid under pressure and operative to another position for preventing said mechanism from operating to recharge the brake pipe with fluid under pressure, and a magnet valve device automatically operative upon operation of either the trip cock device or the conductor's valve device for effecting operation of said means to said other position, said magnet valve device being manually operative for effecting operation of said means to said normal position.

15. In a fluid pressure brake equipment of the type comprising a brake pipe, a brake valve device having a release position for supplying fluid under pressure to said brake pipe and an application position for releasing fluid under pressure from the brake pipe, brake controlling mechanism operative upon a reduction in the pressure of fluid in said brake pipe to effect an application of the brakes and upon an increase in brake pipe pressure to effect a release of the brakes, in combination, an electric switch, a trip cock device controlled from the track for effecting a reduction in brake pipe pressure and for actuating said switch to its circuit closing position, another electric switch, a conductor's valve device controlled from the vehicle for effecting a reduction in brake pipe pressure and for actuating said other switch to its circuit closing position, a feed valve device for charging the brake pipe with fluid under pressure by way of said brake valve device when the brake valve device is in release position, fluid pressure responsive means interposed between said brake valve device and said brake pipe, said fluid pressure responsive means being operative upon venting of fluid under pressure therefrom for preventing the flow of fluid under pressure from the feed valve device to said brake pipe, a magnet valve device operative when energized for venting fluid under pressure from said fluid pressure responsive means, a battery connected to both of said switches and adapted upon actuating either of said switches to their circuit closing position for energizing said magnet valve device, said magnet valve device being manually operative when deenergized to supply fluid under pressure to said fluid pressure responsive means to permit flow of fluid under pressure from the feed valve device to the brake pipe.

16. In a fluid pressure brake equipment of the type comprising a normally charged brake pipe, a feed valve device for supplying fluid under pressure to the brake pipe, a charging communication through which fluid under pressure flows from the feed valve device to the brake pipe, means operative upon a reduction in brake pipe pressure for effecting an application of the brakes and operative upon a subsequent increase in brake pipe pressure for effecting a release of the brakes, means operative in accordance with a track indication for effecting a reduction in brake pipe pressure and manually operative means for effecting a reduction in brake pipe pressure, in combination, magnetically operated means automatically operative upon the operation of one or the other of said brake pipe pressure reducing means to close said communication, and means for manually operating said last mentioned means to open said communication.

17. In a fluid pressure brake equipment of the type comprising a normally charged brake pipe, a feed valve device for supplying fluid under pressure to the brake pipe, a charging communication through which fluid under pressure flows from the feed valve device to the brake pipe, means operative upon a reduction in brake pipe pressure for effecting an application of the brakes and operative upon a subsequent increase in brake pipe pressure for effecting a release of the brakes, means operative in accordance with a track indication for effecting a reduction in brake pipe pressure and manually operative means for effecting a reduction in brake pipe pressure, in combination, fluid pressure responsive means operative to control said charging communication, and magnetically operated means for conditioning said fluid pressure responsive means, said magnetically operated means being automatically operative upon the operation of one or the other of said brake pipe pressure reducing means to condition said fluid pressure responsive means to close said communication and being manually operative to condition said fluid pressure responsive means to open said communication.

18. In a fluid pressure brake equipment of the type comprising a brake pipe, a brake valve device having a release position for supplying fluid under pressure to said brake pipe and an application position for releasing fluid under pressure from the brake pipe, brake controlling mechanism operative upon a reduction in the pressure of fluid in said brake pipe to effect an application of the brakes and upon an increase in brake pipe pressure to effect a release of the brakes, means automatically controlled from the track for effecting a reducing in brake pipe pressure, means manually controlled from the vehicle for effecting a reduction in brake pipe pressure, in combination, a charging communication through which fluid under pressure flows from the brake valve device to the brake pipe, and means interposed in said communication, said means including a magnet valve device automatically operative upon the operation of either one of the last two mentioned brake pipe pressure reducing means to close said communication and being manually operative to open said communication.

19. In a fluid pressure brake equipment of the type comprising a brake pipe, a brake valve device having a release position for supplying fluid under pressure to said brake pipe and an application position for releasing fluid under pressure from the brake pipe, brake controlling mechanism operative upon a reduction in the pressure of fluid in said brake pipe to effect an application of the brakes and upon an increase in brake pipe pressure to effect a release of the brakes, means automatically controlled from the track for effecting a reducing in brake pipe pressure, means manually controlled from the vehicle for effecting a reduction in brake pipe pressure, in combination, a charging communication through which fluid under pressure flows from the brake valve device to the brake pipe, a cut-off valve device normally positioned to open said communication and operative from its normal position to another position to close said communication, means for controlling said cut-off valve device, said means including a magnet valve device automatically operative to effect operation of said cut-off valve device from its normal position to said other position upon operation of either one of the last two mentioned brake pipe pressure reducing means and manually operative to effect operation of said cut off valve device to its normal position.

CLYDE C. FARMER.